US009900770B2

(12) United States Patent
Wolrich et al.

(10) Patent No.: US 9,900,770 B2
(45) Date of Patent: *Feb. 20, 2018

(54) INSTRUCTION FOR ACCELERATING SNOW 3G WIRELESS SECURITY ALGORITHM

(71) Applicant: Intel Corporation, Santa Clara, CA (US)

(72) Inventors: Gilbert M. Wolrich, Framingham, MA (US); Vinodh Gopal, Westborough, MA (US); Erdinc Ozturk, Hillsboro, OR (US); Kirk S. Yap, Westborough, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,698

(22) Filed: Aug. 16, 2016

(65) Prior Publication Data

US 2017/0048699 A1  Feb. 16, 2017

Related U.S. Application Data

(63) Continuation of application No. 13/730,216, filed on Dec. 28, 2012, now Pat. No. 9,419,792.

(51) Int. Cl.
*G06F 15/00* (2006.01)
*G06F 7/00* (2006.01)
(Continued)

(52) U.S. Cl.
CPC ........ *H04W 12/02* (2013.01); *G06F 9/30036* (2013.01); *G06F 9/30134* (2013.01);
(Continued)

(58) Field of Classification Search
None
See application file for complete search history.

(56) References Cited

U.S. PATENT DOCUMENTS

2003/0043917 A1\*  3/2003  Bublil .................... H04N 19/61
                                                              375/240.25
2007/0088772 A1\*  4/2007  Nunes ..................... G06F 5/017
                                                              708/209

(Continued)

OTHER PUBLICATIONS

International Preliminary Report and Written Opinion for Application No. PCT/US2013/045695, dated Aug. 28, 2013, 7 pages.

(Continued)

*Primary Examiner* — Hyun Nam
(74) *Attorney, Agent, or Firm* — Nicholson De Vos Webster & Elliott, LLP

(57) ABSTRACT

Vector instructions for performing SNOW 3G wireless security operations are received and executed by the execution circuitry of a processor. The execution circuitry receives a first operand of the first instruction specifying a first vector register that stores a current state of a finite state machine (FSM). The execution circuitry also receives a second operand of the first instruction specifying a second vector register that stores data elements of a liner feedback shift register (LFSR) that are needed for updating the FSM. The execution circuitry executes the first instruction to produce a updated state of the FSM and an output of the FSM in a destination operand of the first instruction.

20 Claims, 14 Drawing Sheets

(51) Int. Cl.
    *H04W 12/02* (2009.01)
    *G09C 1/00* (2006.01)
    *H04L 9/06* (2006.01)
    *G06F 9/30* (2018.01)
    *G06F 9/38* (2018.01)
    *H04W 12/04* (2009.01)
    *H04L 29/06* (2006.01)

(52) U.S. Cl.
    CPC ............ *G06F 9/3887* (2013.01); *G09C 1/00* (2013.01); *H04L 9/065* (2013.01); *H04L 9/0668* (2013.01); *H04L 63/045* (2013.01); *H04W 12/04* (2013.01); *H04L 63/0457* (2013.01)

(56) References Cited

U.S. PATENT DOCUMENTS

| | | | |
|---|---|---|---|
| 2014/0079215 A1 | 3/2014 | Wei et al. | |
| 2014/0095842 A1 | 4/2014 | Caprioli et al. | |
| 2014/0189289 A1* | 7/2014 | Wolrich | H04L 9/0668 712/7 |
| 2014/0189290 A1* | 7/2014 | Wolrich | H04L 9/0662 712/7 |

OTHER PUBLICATIONS

International Search Report for Application No. PCT/US2013/045695, dated Aug. 28, 2013, 3 pages.

Jenkins C., et al., "Instruction Set Extensions for Accelerating Snow 3G on a Multi-Threaded Software-Defined Radio Platform," Proceedings of the SDR'10 Technical Conference and Product Exposition, 2010, pp. 94-100.

Kitsos P., et al., "High Performance ASIC Implementation of the Snow 3G Stream Cipher," IFIP/IEEE VLSI-SOC, 2008, 4 pages.

Non-Final Office Action from U.S. Appl. No. 13/730,216 dated Sep. 10, 2015, 8 pages.

Notice of Allowance from U.S. Appl. No. 13/730,216 dated Apr. 11, 2016, 9 pages.

Notice of Allowance from U.S. Appl. No. 13/730,216 dated May 9, 2016, 2 pages.

Office Action from foreign counterpart Korean Patent Application No. 10-2015-7013116, dated Mar. 2, 2016, 12 pages.

Orhanou G., et al., "Snow 3G Stream Cipher Operation and Complexity Study", Contemporary Engineering Sciences, vol. 3, 2010, No. 3, pp. 97-111.

ETSI/SAGE, Specification of the 3GPP Confidentially and Integrity Algorithms 128-EEA3 & 128-EIA3. Document 2: ZUC Specification, Version 1.6, (Jun. 28, 2011), 18 pages.

Final Office Action from U.S. Appl. No. 13/730,230 dated Apr. 21, 2016, 7 pages.

Non-Final Office Action from U.S. Appl. No. 13/730,230 dated Sep. 16, 2015, 9 pages.

Non-Final Office Action from U.S. Appl. No. 15/346,410 dated Dec. 15, 2016, 13 pages.

Notice of Allowance from U.S. Appl. No. 13/730,230 dated Jul. 6, 2016, 5 pages.

* cited by examiner

Initialization Mode (Prior Art)

Key-stream Mode (Prior Art)

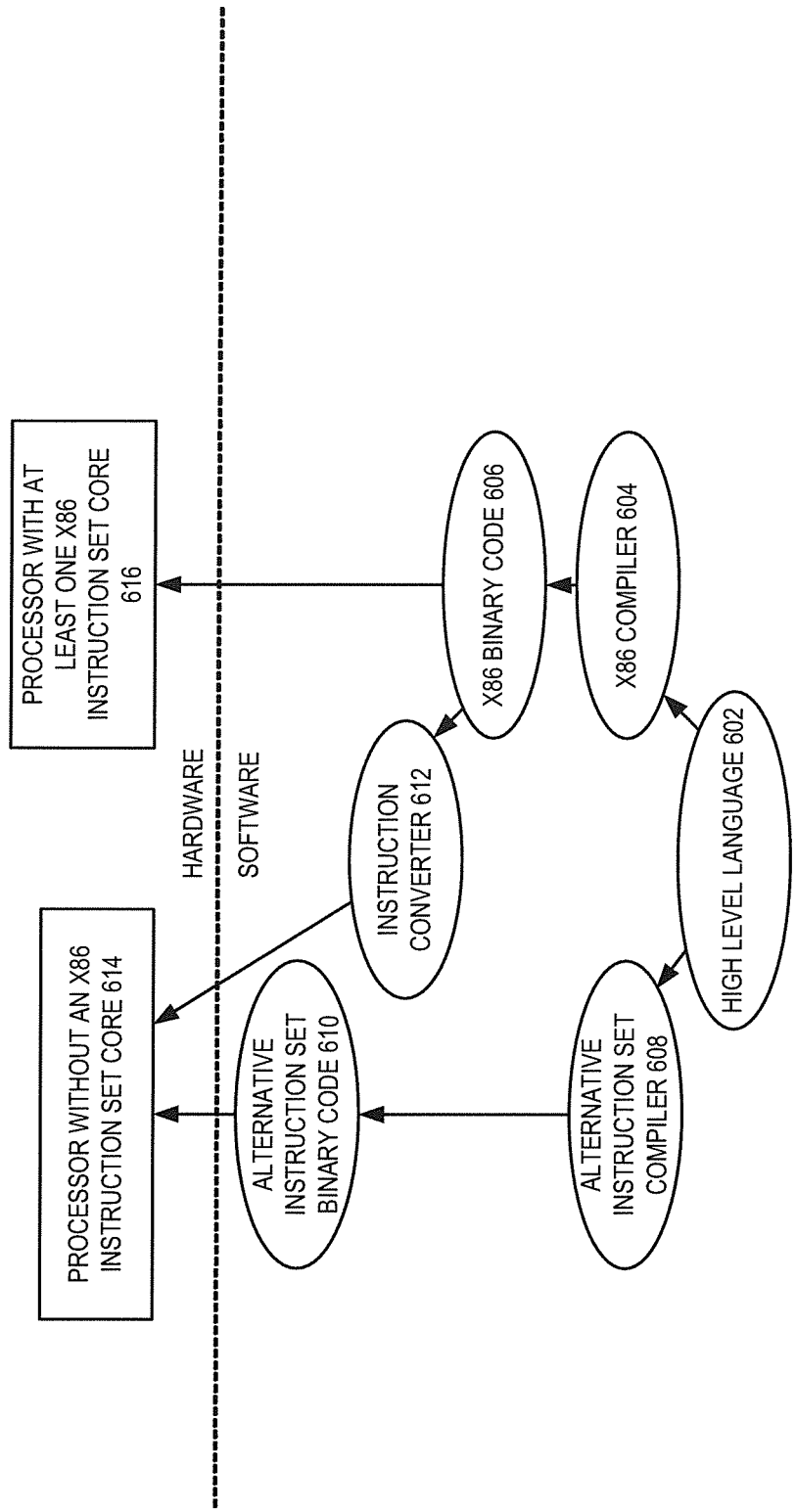

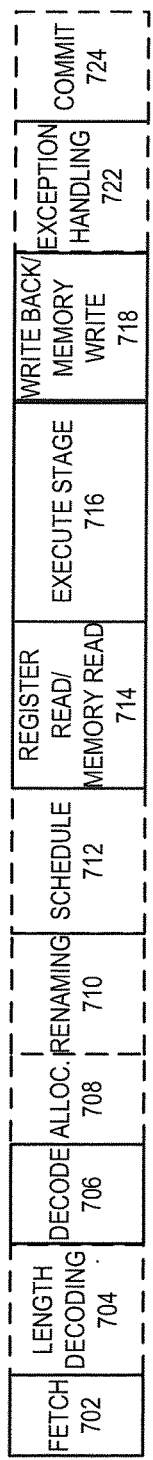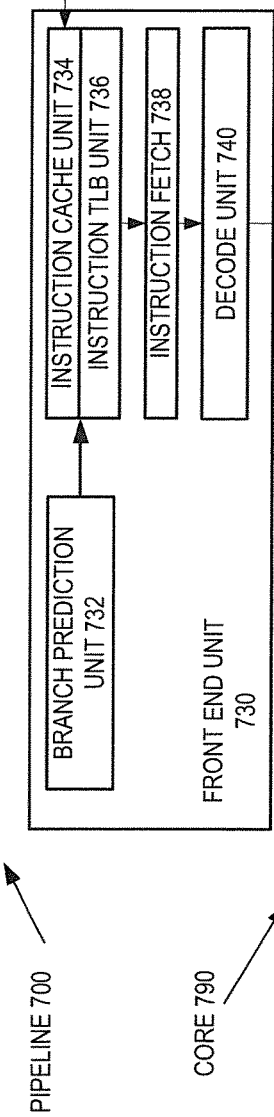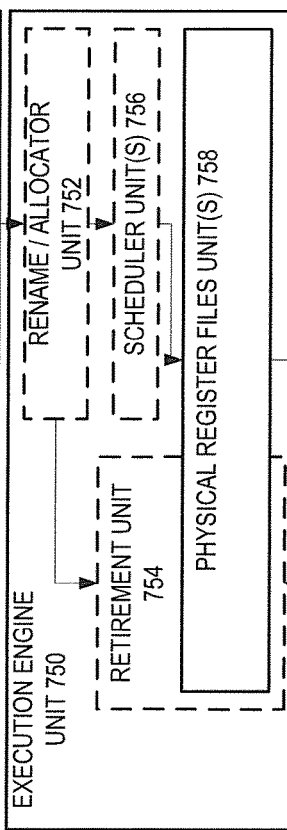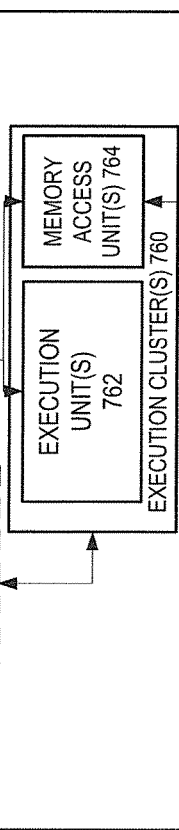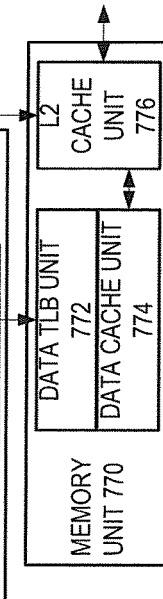
FIG. 7A
FIG. 7B

INSTRUCTION FOR ACCELERATING SNOW 3G WIRELESS SECURITY ALGORITHM

CROSS-REFERENCE TO RELATED APPLICATIONS

The present patent application is a continuation application claiming priority from U.S. patent application Ser. No. 13/730,216, filed Dec. 28, 2012, and titled: "Instruction for Accelerating Snow 3G Wireless Security Algorithm", which is incorporated herein by reference in its entirety.

TECHNICAL FIELD

The present disclosure pertains to microprocessors and associated instruction set architecture that enable efficient wireless security operations.

BACKGROUND ART

In cryptography, a stream cipher is a symmetric key cipher where plaintext digits are combined with a pseudo-random cipher digit stream (key stream). In a stream cipher each plaintext digit is encrypted one at a time with the corresponding digit of the key stream to produce a digit of the cipher text stream. A digit is typically a bit and the combining operation can be an exclusive-or (XOR). The pseudorandom key stream is typically generated serially from a random seed value using digital shift registers. The seed value serves as the cryptographic key for decrypting the cipher text stream.

Stream ciphers can be implemented in software. However, a complicated stream cipher can use over a hundred lines of C code. Even for optimized assembly code, a large number of cycles may be needed to produce a byte of key stream for a complicated stream cipher. Moreover, software implementations generally involve a large number memory access. Thus, software implementations do not provide sufficient speed and energy efficiency for a wide range of applications.

BRIEF DESCRIPTION OF THE DRAWINGS

Embodiments are illustrated by way of example and not limitation in the Figures of the accompanying drawings:

FIG. 6 is a block diagram illustrating the use of a software instruction converter to convert binary instructions in a source instruction set to binary instructions in a target instruction set according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

Figure 1A:
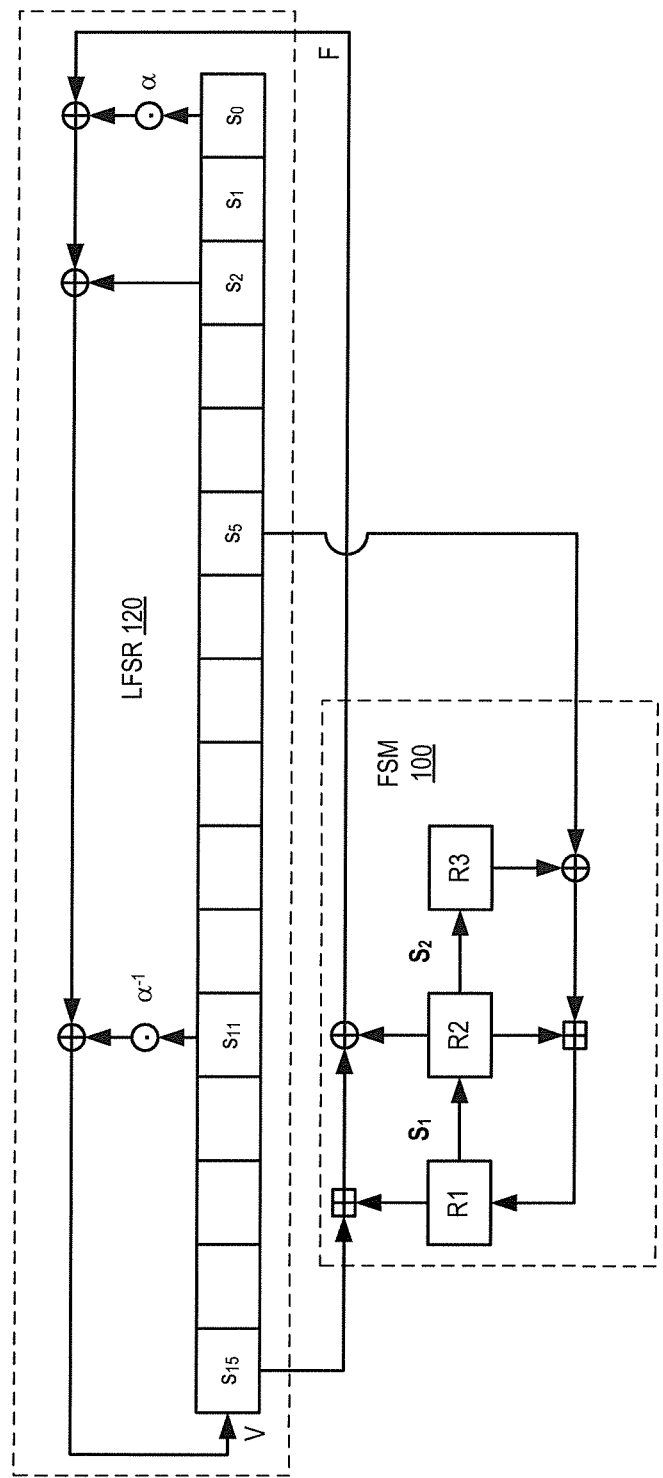
FIG. 1A illustrates a diagram for SNOW 3G operation in an initialization mode.

In the following description, numerous specific details are set forth. However, it is understood that embodiments of the invention may be practiced without these specific details. In other instances, well-known circuits, structures and techniques have not been shown in detail in order not to obscure the understanding of this description.

SNOW 3G is characterized by its high computational complexity and long execution times. To enable high speed wireless communication, the ciphering operation needs to be time efficient. In addition to the timing constraint, the ciphering operation also needs to energy efficient since mobile devices generally have a limited battery.

SNOW 3G is an algorithm based on a Linear Feedback Shift Register (LFSR) with 608 bits of state. The 608 bits include three 32-bit Finite State Machine (FSM) state registers and an LFSR containing sixteen double-words (dwords) (that is, 512 bits in the LFSR). The mathematics for updating the state and producing output words include multiple Substitution-Box (S-Box) translations and Galois field multiplication and exponentiation. SNOW 3G can be implemented by software, which involves a large number of computation and memory access. Thus, software implementations for SNOW 3G are generally slow and energy consuming.

Embodiments described herein provide new processor instructions to perform the SNOW 3G wireless security operation at markedly improved performance when compared to existing software solutions. In one embodiment, the new processor instructions include a SNOW_FSMZ instruction for updating a Finite State Machine (FSM), and SNOW_LFSRV and SNOW_LFSR1 instructions for updating a Linear Feedback Shift Register (LFSR). Each of these instructions utilizes vector registers to perform efficient vectorized computations.

Before describing the new instructions, it is helpful to explain the basic concepts of the SNOW 3G wireless security algorithm. The SNOW 3G algorithm uses an LFSR with sixteen 32-bit data elements (where each data element is a double-word (dword)) and an FSM with three 32-bit state registers R1, R2 and R3. At startup, the sixteen dwords of the LFSR is loaded with combinations of bits from a 128-bit key and a 128-bit initialization variable. The 128-bit key includes four 32-bit words $k_0$, $k_1$, $k_2$ and $k_3$. The 128-bit initialization variable includes four 32-bit words $IV_0$, $IV_1$, $IV_2$ and $IV_3$. In the following, the number 1 represents an all-ones dword (0xffffffff). The sixteen dwords in the LFSR are as follows:

| | | | |
|---|---|---|---|
| $s_{15} = k_3 \oplus IV_0$ | $s_{14} = k_2$ | $s_{13} = k_1$ | $s_{12} = k_0 \oplus IV_1$ |
| $s_{11} = k_3 \oplus 1$ | $s_{10} = k_2 \oplus 1 \oplus IV_2$ | $s_9 = k_1 \oplus 1 \oplus IV_3$ | $s_8 = k_0 \oplus 1$ |
| $s_7 = k_3$ | $s_6 = k_2$ | $s_5 = k_1$ | $s_4 = k_0$ |
| $s_3 = k_3 \oplus 1$ | $s_2 = k_2 \oplus 1$ | $s_1 = k_1 \oplus 1$ | $s_0 = k_0 \oplus 1$ |

At startup, the FSM is initialized with R1=R2=R3=0. Next, the FSM and the LFSR are run 32 times in an initialization mode where the output of the FSM is used as input to the LFSR update.

After the initial 32 updates to the FSM and the LFSR, the FSM is updated one more time with the FSM output being discarded. The LFSR is then updated in a key-stream mode, followed by an update of the FSM producing a 32-bit output F. The FSM output F is XORed with dword so of the LFSR to produce a 32-bit key-stream output Z, and the LFSR is updated again in the key-stream mode. The FSM update, Z output, and LFSR update continue in a loop for a number of iterations until the required n dwords of key-stream output are generated.

FIG. 1A illustrates an example of an LFSR 120 and an FSM 100 in the initialization mode. In the initialization mode, each of the 32 LFSR startup updates is performed by determining a 32-bit dword V, which is generated from $s_{11}$, $S_2$, $S_0$ and the FSM output F. Dwords $S_{15}$ to $S_1$ of the LFSR 120 before the update are "right-shifted" to $S_{14}$ to $S_0$, and $S_{15}$ is updated with V. In the following, II is used as a concatenation operator, and $\oplus$ is a bitwise exclusive-OR (XOR) operator. Further, let $s_{0.0}\|s_{0.1}\|s_{0.2}\|s_{0.3}$ represent the four bytes of $s_0$, with $s_{0.0}$ being the most significant byte of $s_0$; and let $s_{11.0}\|s_{11.1}\|s_{11.2}\|s_{11.3}$ represent the four bytes of $s_{11}$, with $s_{11.0}$ being the most significant byte of $s_{11}$. Specifically, in the initialization mode, $V=(s0,1\|s0,2\|s0,3\|0x00) \oplus MUL\alpha(s0,0) \oplus s2 \oplus (0x00\|s11,0\|s11,1\|s11,2) \oplus D_{IV}\alpha(s11,3) \oplus F$.

In the expression of V, $MUL_\alpha$ and $DIV_\alpha$ are functions defined in SNOW 3G based on MULx and MULxPOW mathematical functions. Each of $MUL_\alpha$ and $DIV_\alpha$ maps 8 bits to 32 bits. While both $MUL_\alpha$ and $DIV_\alpha$ are complex to implement from the mathematical definition of the functions due to the recursive requirements of the MULxPOW operation, a 256 entry by 32 bit output table can be used for each of the $MUL_\alpha$ and $DIV_\alpha$ functions (i.e., 1 KByte for each function).

Figure 1B:
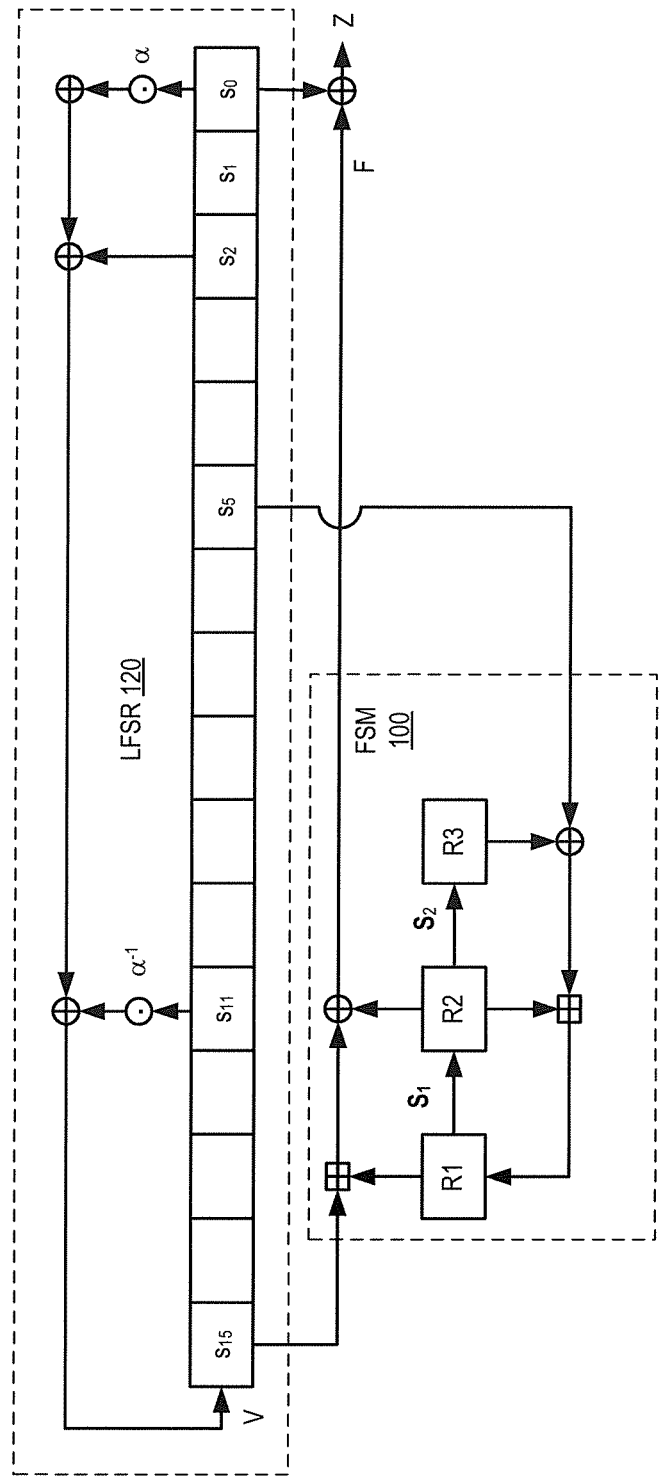
FIG. 1B illustrates a diagram for SNOW 3G operation in a key-stream mode.

FIG. 1B illustrates an example of the LFSR and the FSM in the key-stream mode. In the key-stream mode, the 32-bit dword V is generated from $s_{11}$, $s_2$ and $s_0$. Specifically, $V=(s0,1\|s0,2\|s0,3\|0x00) \oplus MUL_\alpha(s_{0,0}) \oplus s2 \oplus (0x00\|s_{11,0}\|s_{11,1}\|s_{11,2}) \oplus DIV_\alpha(s_{11,3})$. As described above, the $MUL_\alpha$ and $DIV_\alpha$ results can be obtained by table look-ups.

In both the initialization mode and the key-stream mode, each FSM update uses two 32-bit LFSR dwords. Dword $S_{15}$ is used to produce a 32-bit output word F, and $S_5$ is used to update the FSM state registers R1, R2, and R3, where each of the R1, R2, and R3 is a 32-bit dword. In FIGS. 1A and 1B, $\boxplus$ represents integer addition modulo $2^{32}$. The FSM output $F=(s_{15} \boxplus R1) \oplus R2$. Subsequently, the state registers are updated as following: First, an intermediate value r is computed as $r=R2 \boxplus (R3 \oplus s_5)$. Then set $R3=S_2(R2)$, $R2=S_1$ (R1), and R1=r.

In the above computation, $s_1$ and $s_2$ are 32×32 bit S-BOX functions. $s_1$ is the Rijndael S-Box $S_R$ used in the Advanced Encryption Standard (AES) cipher. For a 32-bit input $w=w_0\|w_1\|w_2\|w_3$, with $w_0$ the most significant byte, $S_R(w)=r_0\|r_1\|r_2\|r_3$, with $r_0$ the most and $r_3$ the least significant byte. Bytes $r_0$, $r_1$, $r_2$ and $r_3$ in the output are defined as:

$r_0=MULx(S_R(w_0)$, 0x1B$)\oplus S_R(w_1)\oplus S_R(w_2)\oplus MULx(S_R(w_3)$, 0x1B$)\oplus S_R(w_3)$, $r_1=MULx(S_R(w_0)$, 0x1B$)\oplus S_R(w_0)\oplus MULx(S_R(w_1)$, 0x1B$)\oplus S_R(w_2)\oplus S_R(w_3)$, $r_2=S_R(w_0)\oplus MULx(S_R(w_1)$, 0x1B$)\oplus S_R(w_1)\oplus MULx(S_R(w_2)$, 0x1B$)\oplus S_R(w_3)$, $r_3=S_R(w_0)\oplus S_R(w_1)\oplus MULx(S_R(w_2)$, 0x1B$)\oplus S_R(w_2)\oplus MULx(S_R(w_3)$, 0x1B$)$.

The MULx function is defined as: if the leftmost (most significant) bit of the first operand ($v_1$) is one, then MULx ($v_1$, $v_2$)=$v_1 <<_8 1 \oplus v2$; else, MULx($v_1$, $v_2$)= $v_1 <<_8 1$ (where $<<_8$ is left-shift by 8 bits).

The $S_2$ S-Box also performs a 32-bit to 32-bit mapping based on four 8-bit to 8-bit translations. The S-Box used for $S_2$ is the $S_Q$ S-Box defined in SNOW 3G. Similar to the definition of $S_1$, for a 32-bit input $w=w_0\|w_1\|w_2\|w_3$, with $w_0$ the most significant byte, $S_Q(w)=r_0\|r_1\|r_2\|r_3$, with $r_0$ the most and $r_3$ the least significant byte. Bytes $r_0$, $r_1$, $r_2$ and $r_3$ in the output are defined as:

$r_0=MUL_x(S_Q(w_0)$, 0x69$)\oplus S_Q(w_1)\oplus S_Q(w_2)\oplus MUL_x(S_Q(w_3)$, 0x69$)\oplus S_Q(w_3)$, $r_1=MULx(S_Q(w_0)$, 0x69$)\oplus S_Q(w_0)\oplus MULx(S_Q(w_1)$, 0x69$)\oplus S_Q(w_2)\oplus S_Q(w_3)$, $r_2=S_Q(w_0)\oplus MULx(SQ(w_1)$, 0x69$)\oplus S_Q(w_1)\oplus MULx(S_Q(w_2)$, 0x69$)\oplus S_Q(w_3)$, $r_3=S_Q(w_0)\oplus S_Q(w_1)\oplus MULx(S_Q(w_2)$, 0x69$)\oplus S_Q(w_2)\oplus MULx(S_Q(w_3)$, 0x69$)$.

The above description explains the computations of the SNOW 3G wireless security algorithm. Embodiments of the invention provide new instructions to an instruction set architecture (ISA) to enable efficient computation of the SNOW 3G algorithm. The ISA described herein supports Single Instruction, Multiple Data (SIMD) operations. Instead of a scalar instruction operating on only one data element or pair of data elements, a SIMD instruction (also referred to as packed data instruction or vector instruction) may operate on multiple data elements or multiple pairs of data elements simultaneously or in parallel. The processor may have parallel execution hardware responsive to the vector instruction to perform the multiple operations simultaneously or in parallel.

The new instructions and corresponding data path enable a processor supporting 256-bit or 512-bit architectural vector registers to execute SNOW 3G at a 3-cycle per 32-bit dword throughput. In the following description, the term YMM refers to a 256-bit vector register. Although YMM registers are used in the following description, it is appreciated that other vector registers (e.g., 512-bit ZMM registers) may be used in alternative embodiments.

In one embodiment, the LFSR state of sixteen 32-bit data elements, $s_{15}$ to $s_0$, is stored in two vector registers (e.g., two YMM registers). Since the FSM uses $s_{15}$ and $s_5$, and an XOR of so and F (the 32-bit output of the FSM) is needed to produce Z (the 32-bit key-stream output), the LFSR data elements are organized within the two YMM registers with $s_{15}$, $s_5$, and $s_0$ in the same YMM register. That is, the LFSR data elements needed by the FSM are stored in the same vector register.

In one embodiment, the SNOW 3G LFSR may be organized such that its sixteen data elements are stored in two vector registers YMM1 and YMM2 as follows:

| Dword | | | | | | | |
|---|---|---|---|---|---|---|---|
| 0 | 1 | 2 | 3 | 4 | 5 | 6 | 7 |
| YMM1 $s_{15}$ | $s_6$ | $s_5$ | $s_4$ | $s_3$ | $s_2$ | $s_1$ | $s_0$ |
| YMM2 $s_{14}$ | $s_{13}$ | $s_{12}$ | $s_{11}$ | $s_{10}$ | $s_9$ | $s_8$ | $s_7$ |

Figure 2A:
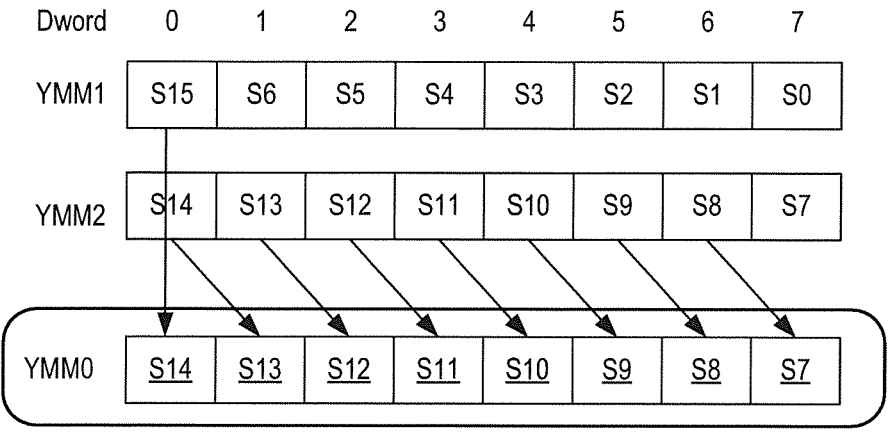
FIGS. 2A-2C illustrates three vector instructions for performing SNOW 3G operations according to one embodiment.

FIG. 2A illustrates an instruction SNOW_LFSR1 YMM0, YMM1, YMM2 according to one embodiment. The first source register YMM1 has pre-updated dwords $s_{15}$, $s_6$, $s_5$, $s_4$, $s_3$, $s_2$, $s_1$ and $s_0$. The second source register YMM2 has pre-updated dwords $s_{14}$, $s_{13}$, $s_{12}$, $s_{11}$, $s_{10}$, $s_9$, $s_8$ and $s_7$. The destination register YMM0 has updated dwords $s_{14}$, $s_{13}$, $s_{12}$, $s_{11}$, $s_{10}$, $s_9$, $s_8$ and $s_7$ (the updated dword are shown in FIG. 2A with underlines). The instruction is executed by a processor by setting: YMM0 dword 0 to the pre-updated YMM1 dword 0, and YMM0 dwords 1-7 to the pre-updated YMM2 dwords 0-6. That is, the instruction shifts $s_{15}$ from YMM1 into $s_{14}$ of YMM0, and shifts $s_{14}$-$s_8$ from YMM2 into $s_{13}$-$s_7$ of YMM0 as shown in FIG. 2A.

Figure 2B:
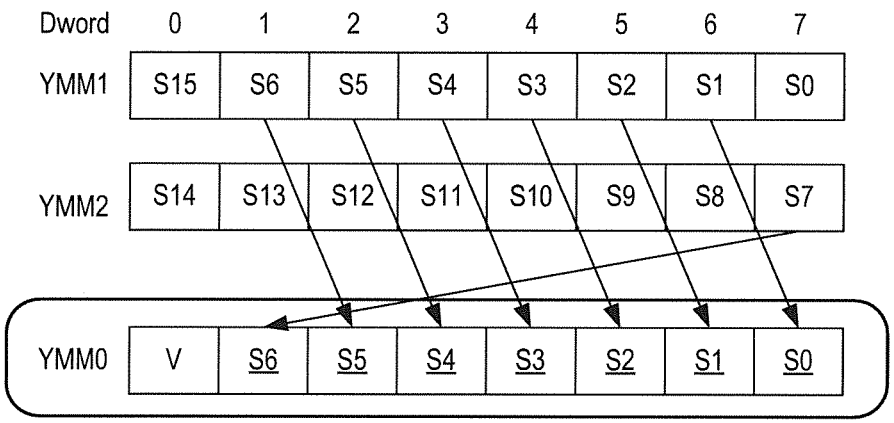

FIG. 2B illustrates another instruction SNOW_LFSRV YMM0, YMM1, YMM2 according to one embodiment. The first source register YMM1 has pre-updated dwords $s_{15}$, $s_6$, $s_5$, $s_4$, $s_3$, $s_2$, $s_1$ and $s_0$. The second source register YMM2 has pre-updated dwords $s_{14}$, $s_{13}$, $s_{12}$, $s_{11}$, $s_{10}$, $s_9$, $s_8$ and $s_7$. The instruction is executed by a processor by first determining V (the LFSR output). The mathematical expression of V is described above with reference to FIGS. 1A and 1B and is repeated below.

In the initialization mode, $V = (s0,1 \| s0,2 \| s0,3 \| 0x00) \oplus MUL_\alpha(s0,0) \oplus s2 \oplus (0x00 \| s11,0 \| s11,1 \| s11,2) \oplus DIV_\alpha(s11,3) \oplus F$. In one embodiment, the LFSR output F is XORed with dword 5 ($s_2$) of source YMM1 prior to the execution of the SNOW_LFSRV instruction to generate the V value.

In the key-stream mode, $V = (s0,1 \| s0,2 \| s0,3 \| 0x00) \oplus MUL_\alpha(s_{0,0}) \oplus s_2 \oplus (0x00 \| s_{11,0} \| s_{11,1} \| s_{11,2}) \oplus DIV_\alpha(s_{11,3})$. In both the initialization mode and the key-stream mode, the results of $MUL_\alpha(s0,0)$ and $DIV_\alpha(s_{11,3})$ can be obtained by two table look-ups performed in parallel. In one embodiment, each of the $MUL_\alpha$ and $DIV_\alpha$ functions is supported by a 256-entry table with 32 bits of output in read-only memory (ROM) located in the execution data path of the instruction accessible by the processor. In alternative embodiments, other forms of memory may also be used.

After V is determined, the destination register YMM0 dword 0 is set to V, YMM0 dword 1 is set to YMM2 dword 7, and YMM0 dwords 2-7 are set to YMM1 dwords 1-6. That is, the instruction shifts $s_7$ from YMM2 into $s_6$ of YMM0, and shifts $s_6$-$s_1$ from YMM1 into $s_5$-$s_0$ of YMM0 as shown in FIG. 2B. The SNOW_LFSRV instruction can be executed in a 3-cycle pipeline.

Figure 2C:
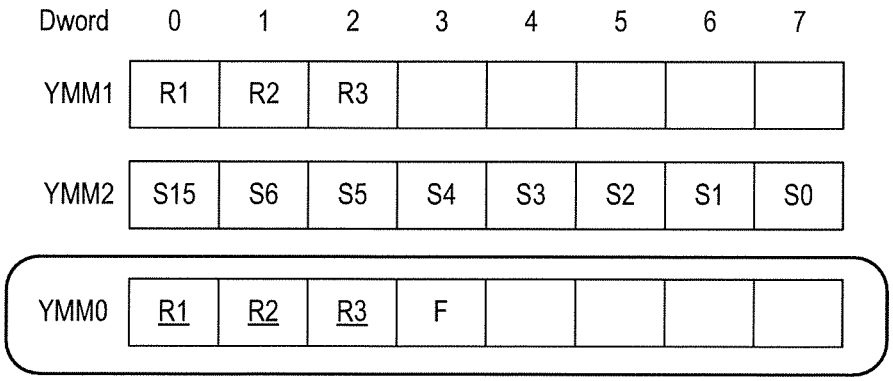

FIG. 2C illustrates yet another instruction SNOW_FSMZ YMM0, YMM1, YMM2. This instruction is used to update the FSM state and generate the next FSM output F. The first source register YMM1 stores the pre-updated R1, R2 and R3 states, the second source register YMM2 stores LFSR dwords $s_{15}$, $s_6$, $s_5$, $s_4$, $s_3$, $s_2$, $s_1$ and $s_0$. The destination register YMM0 is written with updated R1, R2, R3 and output F. Thus, YMM0 is logically divided into four 32-bit lanes. As the updated R1, R2, R3 and F are computed from pre-updated R1, R2 and R3, the R1, R2, R3 and F updates can be computed in parallel and the results can be stored into the four lanes YMM0.

As described above with reference to FIGS. 1A and 1B, the updates to R2 and R3 are computed by evaluating $S_R$ and $S_Q$ S-Box functions. For a 32-bit input $w = w_0 \| w_1 \| w_2 \| w_3$, the result of $S_R(w)$ can be obtained by four parallel table look-ups ($S_R(w_0)$, $S_R(w_1)$, $S_R(w_2)$, $S_R(w_3)$); similarly, the result of $S_Q(w)$ can be obtained by four parallel table look-ups ($S_Q(w_0)$, $S_Q(w_1)$, $S_Q(w_2)$, $S_Q(w_3)$). In one embodiment, a total of eight tables can be stored in a read-only memory to enable eight parallel table look-ups. Each of $S_R$ and $S_Q$ functions maps 8 bits to 8 bits; thus, each function can be supported by a 256-entry table with 8-bit output in read-only memory (ROM) located in the execution data path of the instruction accessible by the processor. In alternative embodiments, other forms of memory may also be used.

The SNOW_FSMZ instruction enables a processor to execute the four parallel updates of R1, R2, R3 and F, including the eight parallel table look-ups for the $S_R$ and $S_Q$ functions, in a SIMD pipeline. In one embodiment, the SIMD pipeline may be a 3-cycle SIMD pipeline. The instruction reads from two vector registers and writes into one vector register. In comparison, a software program that performs the same FSM updates would include many more instructions and incur many more read and write accesses. The data elements of the LFSR are organized such that the set of LFSR dwords needed by the FSM updates are loaded into one vector register (i.e., the second source operand of SNOW_FSMZ). This vector register can also be used as the source operands of SNOW_LFSR1 and SNOW_LFSRV for LFSR updates. The computation of the SNOW 3G algorithm is partitioned to maximize execution efficiency. The throughput of SNOW 3G with the new instructions is dependent upon the execute ports assigned for the instructions as well as the instruction latency.

The following is an example code segment for performing SNOW 3G wireless security operations using the three new instructions SNOW_LFSR1, SNOW_LFSRV and SNOW_FSMZ. The operations start with the FSM states R1, R2 and R3 in YMM4, LFSR dwords $s_{15}$ and $s_6$-$s_0$ in YMM0, and LFSR dwords $s_{14}$-$s_7$ in YMM1.

```
SNOW_FSMZ YMM5, YMM4, YMM0    /* first update */
SNOW_LFSRV YMM2, YMM0, YMM1
SNOW_LFSR1 YMM3, YMM0, YMM1
MOVD YMM5, mem  /* move 32 bits from YMM register to output */
SNOW_FSMZ YMM4, YMM5, YMM2    /* second update */
SNOW_LFSRV YMM0, YMM2, YMM3
SNOW_LFSR1 YMM1, YMM2, YMM3
MOVD YMM4, mem  /* move 32 bits from YMM register to output */
```

In the first update, YMM0 has the LFSR dwords needed by the FSM update. The updated FSM state is in YMM5 and the updated LFSR state is in YMM2 and YMM3, where YMM2 has the LFSR dwords needed by the next FSM update. In the second update, the updated FSM state is in YMM4 and the updated LFSR state is in YMM0 and YMM1, where YMM0 has the LFSR dwords needed by the next FSM update. Thus, the SNOW 3G operations can be performed in a loop with alternating first and second updates.

Figure 3:
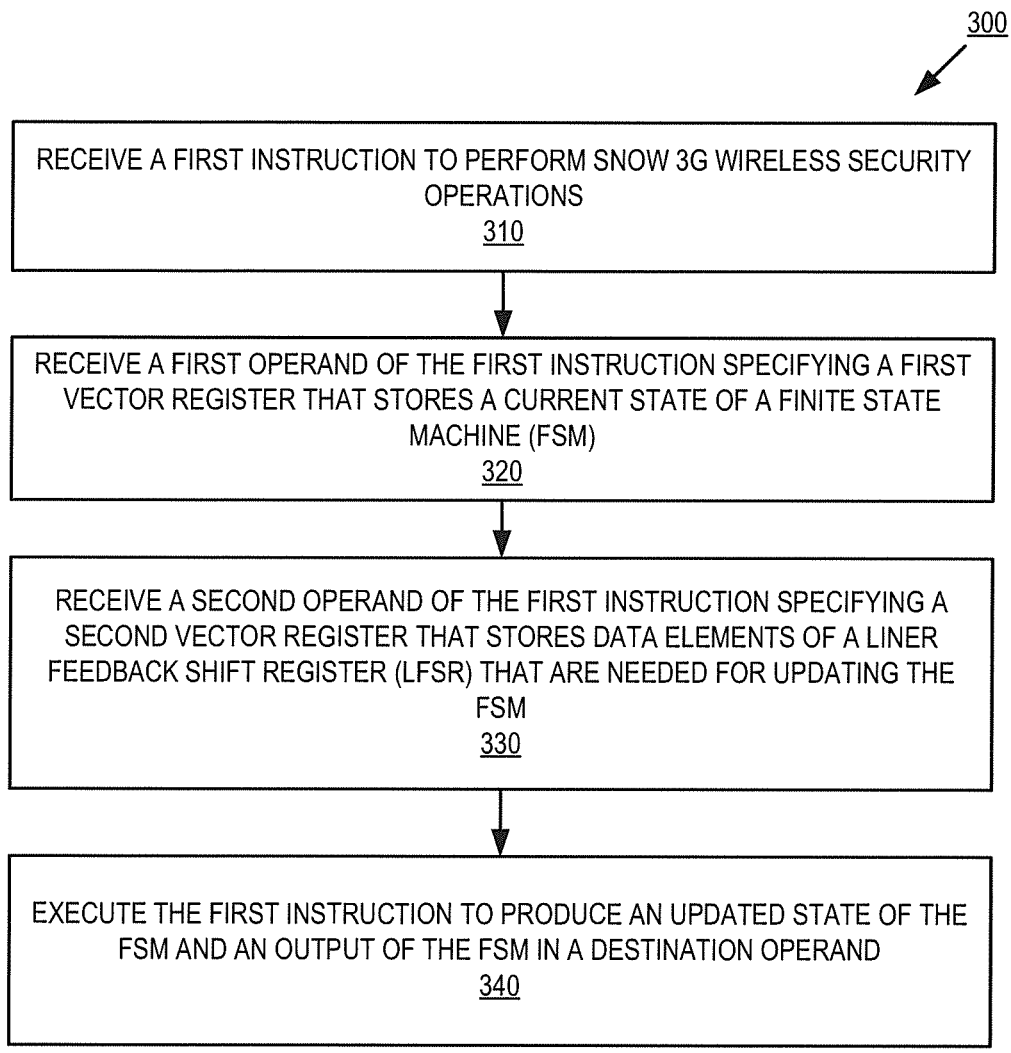
FIG. 3 is a flow diagram illustrating operations to be performed responsive to a first vector instruction according to one embodiment.

FIG. 3 is a flow diagram of a method 300 for performing SNOW 3G wireless security operations according to one embodiment. The method 300 begins with a processor (more specifically, execution circuitry such as the execution engine unit 750 of FIG. 7B) receives a first instruction to perform SNOW 3G wireless security operations (block 310). The execution circuitry receives a first operand of the first instruction specifying a first vector register that stores a current state of a FSM (e.g., the FSM 100 of FIGS. 1A and 1B) (block 320). The execution circuitry also receives a second operand of the first instruction specifying a second vector register that stores data elements of a LFSR (e.g., the LFSR 120 of FIGS. 1A and 1B) that are needed for updating the FSM (block 330). The execution circuitry then executes the first instruction to produce an updated state of the FSM and an output of the FSM in a destination operand (block 340).

Figure 4:
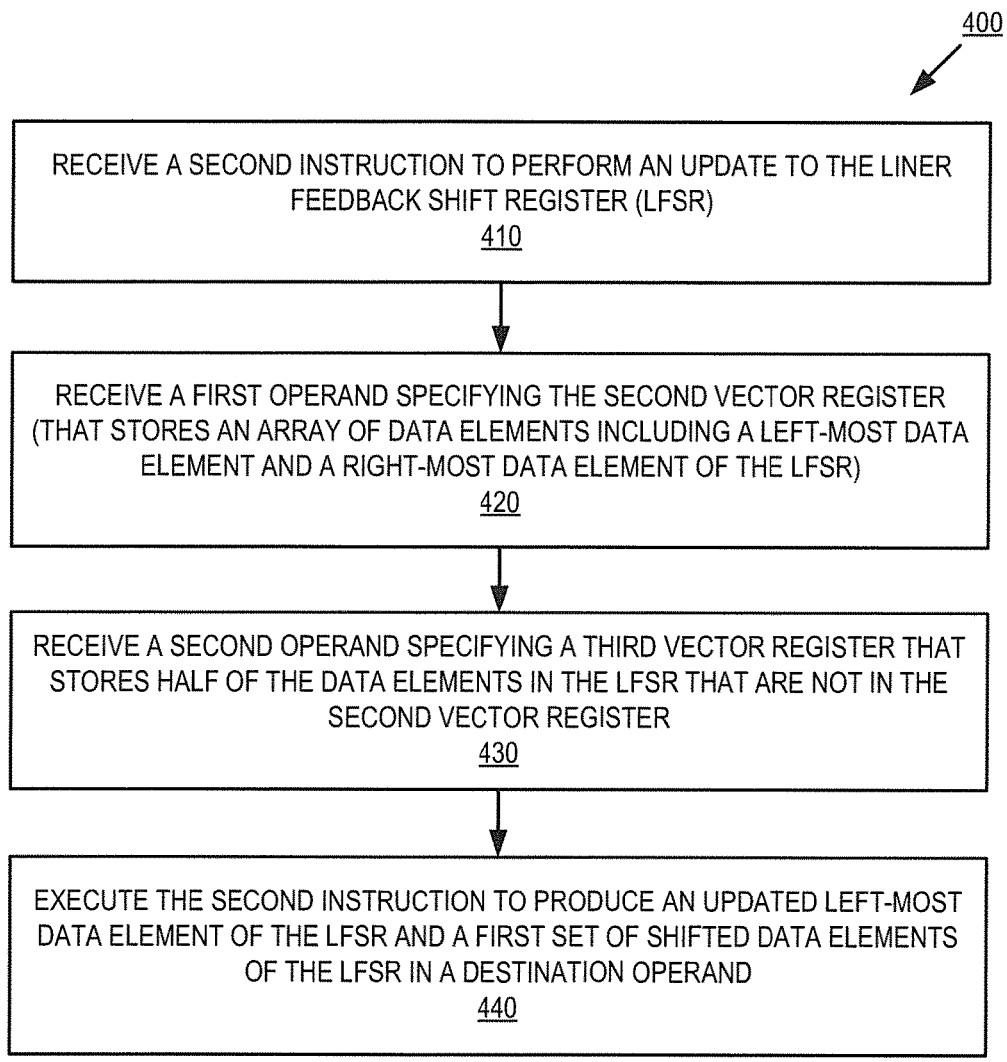
FIG. 4 is a flow diagram illustrating operations to be performed responsive to a second vector instruction according to one embodiment.

FIG. 4 is a flow diagram of a method 400 for performing an update to the LFSR according to one embodiment. The method 400 begins with a processor (more specifically, execution circuitry such as the execution engine unit 750 of FIG. 7B) receives a second instruction to perform an update to the LFSR (block 410). The execution circuitry receives a first operand of the second instruction specifying the second vector register that stores data elements of the LFSR that are needed for updating the FSM (block 420). The execution circuitry also receives a second operand of the second instruction specifying a third vector register that stores half of the data elements in the LFSR that are not in the second vector register (block 430). The execution circuitry then executes the second instruction to produce an updated left-most data element of the LFSR and a first set of shifted data elements of the LFSR in a destination operand (block 440).

Figure 5:
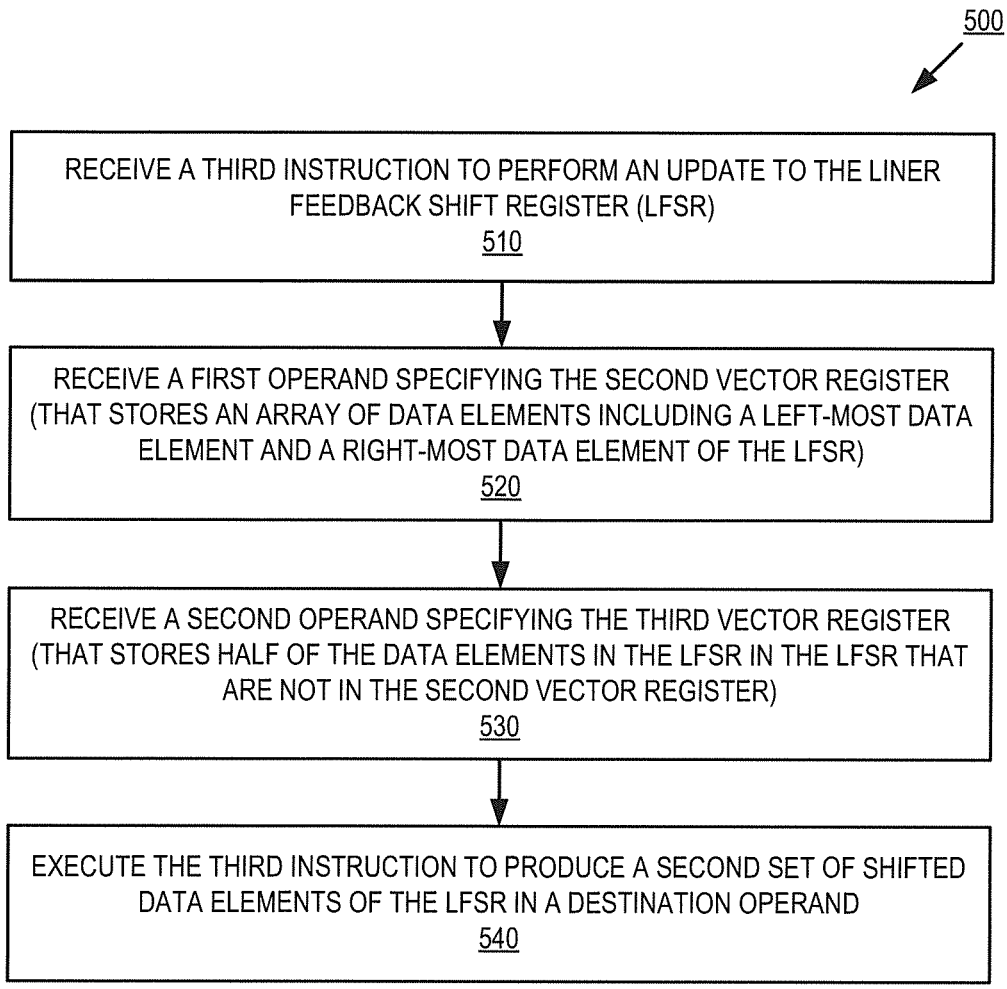
FIG. 5 is a flow diagram illustrating operations to be performed responsive to a third vector instruction according to one embodiment.

FIG. 5 is a flow diagram of a method 500 for performing an update to the LFSR according to one embodiment. The method 500 begins with a processor (more specifically, execution circuitry such as the execution engine unit 750 of FIG. 7B) receives a third instruction to perform an update to the LFSR (block 510). The execution circuitry receives a first operand of the third instruction specifying the second vector register that stores data elements of the LFSR that are needed for updating the FSM (block 520). The execution circuitry also receives a second operand of the third instruction specifying the third vector register that stores half of the data elements in the LFSR that are not in the second vector register (block 530). The execution circuitry then executes the third instruction to produce a second set of shifted data elements of the LFSR in a destination operand (block 540).

In various embodiments, the methods of FIGS. 3-5 may be performed by a general-purpose processor, a special-purpose processor (e.g., a graphics processor or a digital signal processor), or another type of digital logic device or instruction processing apparatus. In some embodiments, the methods of FIGS. 3-5 may be performed by a processor, apparatus, or system, such as the embodiments shown in FIGS. 7A-B, 8A-B and 9-13. Moreover, the processor, apparatus, or system shown in FIGS. 7A-B, 8A-B and 9-13 may perform embodiments of operations and methods either the same as, similar to, or different than those of the methods of FIGS. 3-5.

In some embodiments, the processor, apparatus, or system of FIGS. 7A-B, 8A-B and 9-13 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures
In-order and Out-of-order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-order Core Architecture

Figure 8B:
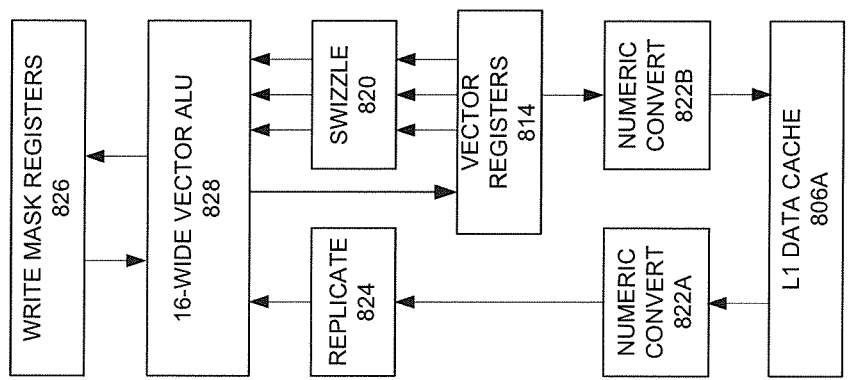
FIGS. 8A-B are block diagrams of a more specific exemplary in-order core architecture according to one embodiment.
Figure 8A:
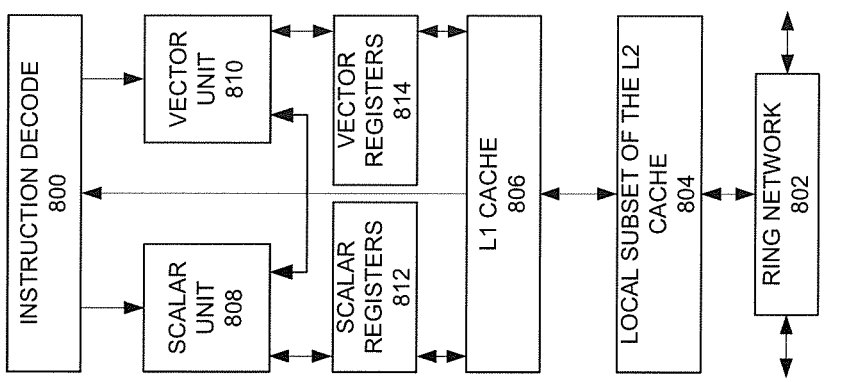

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
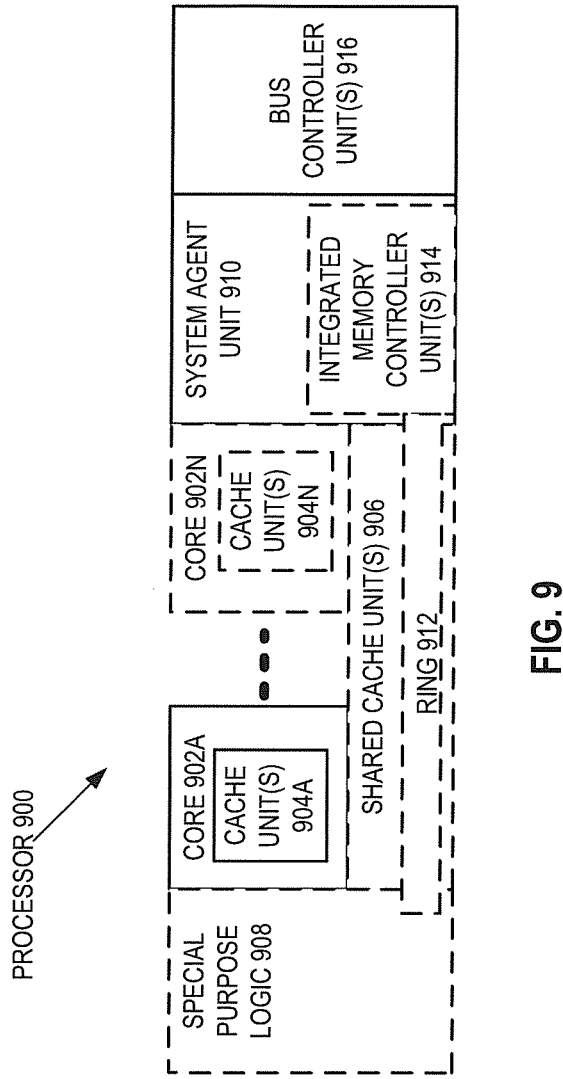
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
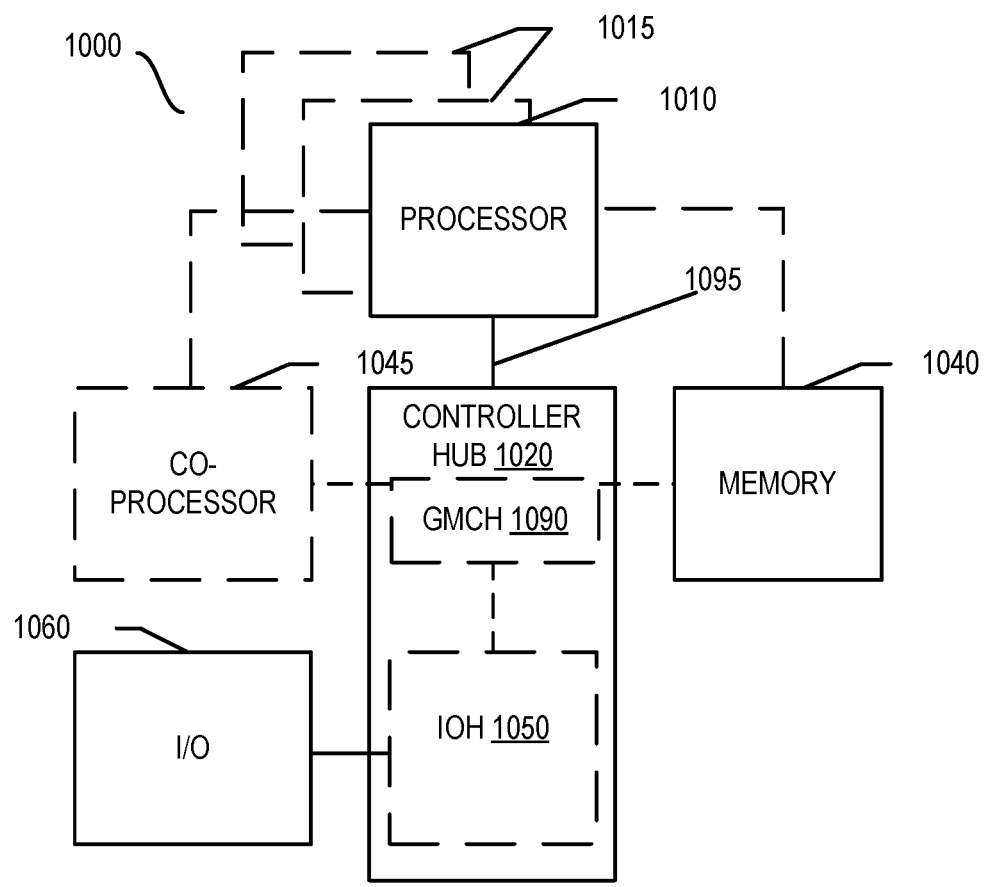
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
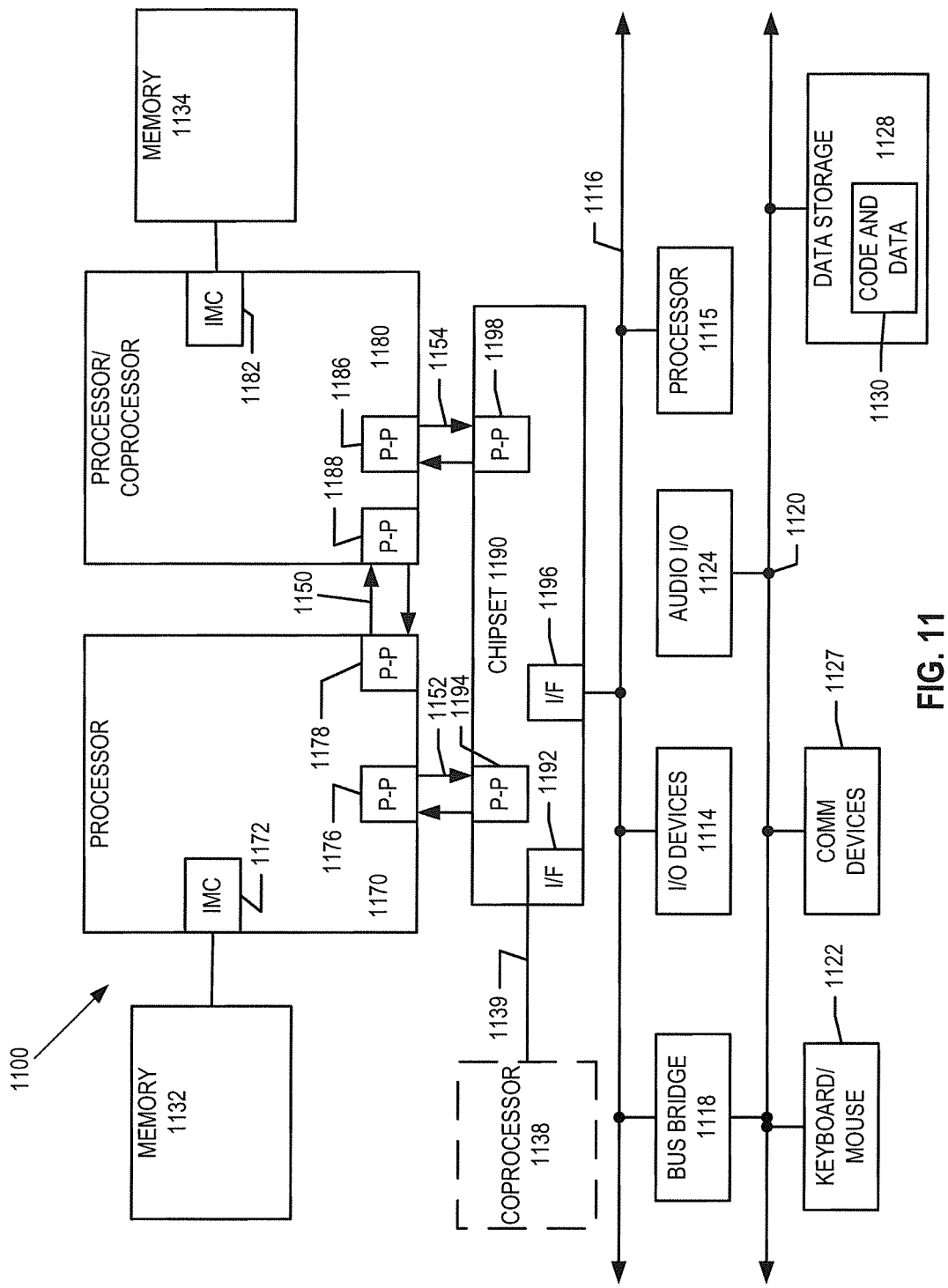
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
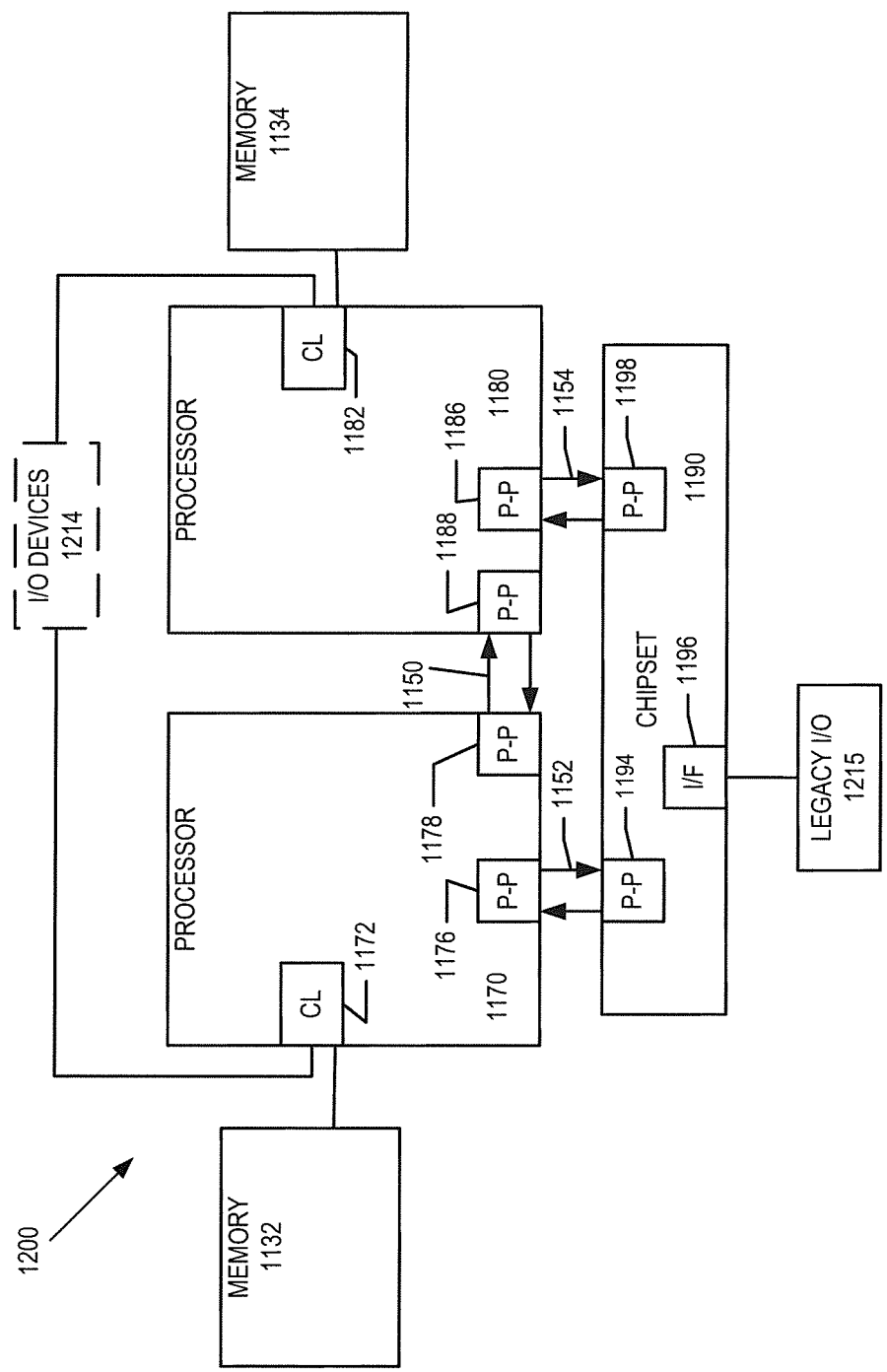
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
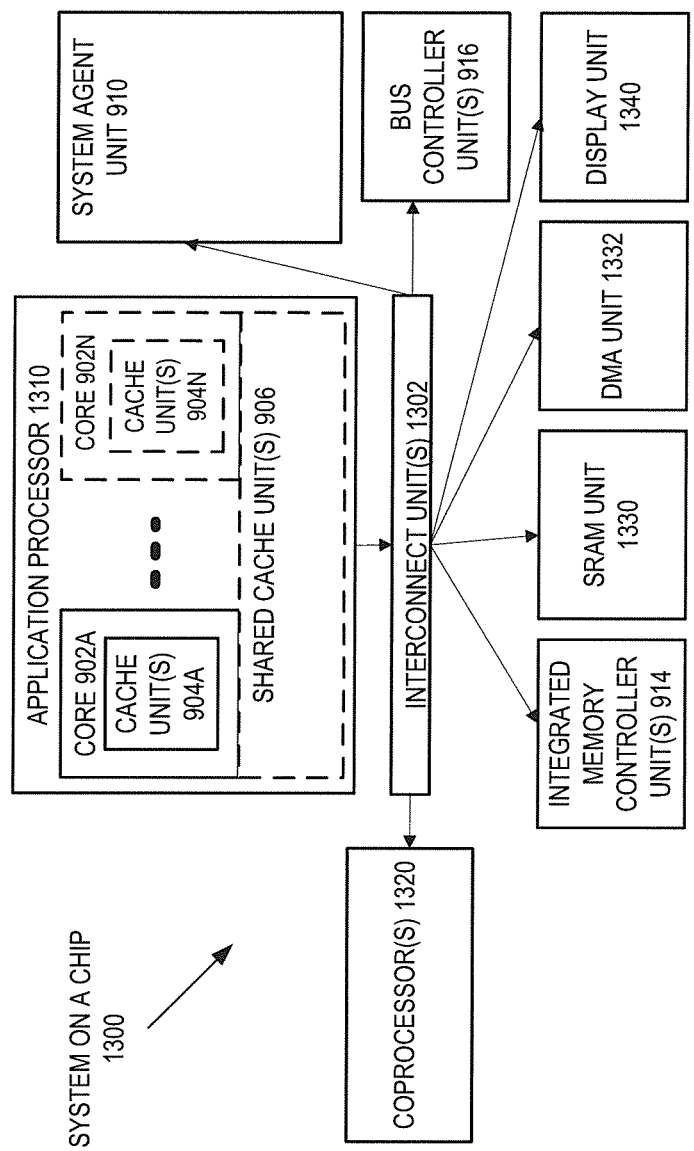
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s)

916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. An apparatus comprising:
   fetch circuitry to fetch instructions;
   decode circuitry to decode the fetched instructions;
   a plurality of vector registers including a first vector register and a second vector register; and
   execution circuitry coupled to the plurality of vector registers, the execution circuitry operative to:
      receive a first decoded instruction to perform wireless security operations;
      receive a first operand of the first decoded instruction specifying the first vector register that stores a current state of a finite state machine (FSM);
      receive a second operand of the first decoded instruction specifying the second vector register that stores data elements of a liner feedback shift register (LFSR) that are needed for updating the FSM; and
      execute the first decoded instruction to produce an updated state of the FSM and an output of the FSM in a destination operand of the first decoded instruction.

2. The apparatus of claim 1, wherein the plurality of vector registers include a third vector register, the execution circuitry operative to:
   receive a second decoded instruction to perform an update to the LFSR;
   receive a first operand of the second decoded instruction specifying the second vector register;
   receive a second operand of the second decoded instruction specifying the third vector register that stores half of the data elements in the LFSR that are not in the second vector register; and
   execute the second decoded instruction to produce an updated left-most data element of the LFSR and a first set of shifted data elements of the LFSR in a destination operand of the second decoded instruction.

3. The apparatus of claim 2, wherein the execution circuitry is operative to:
   receive a third decoded instruction to perform the update to the LFSR;
   receive a first operand of the third decoded instruction specifying the second vector register;
   receive a second operand of the third decoded instruction specifying the third vector register; and
   execute the third decoded instruction to produce a second set of shifted data elements of the LFSR in a destination operand of the third decoded instruction.

4. The apparatus of claim 3, wherein the execution circuitry is operative to:

execute the first decoded instruction, the second decoded instruction, and the third decoded instruction in a first update phase that uses a first set of source operands;

execute the first decoded instruction, the second decoded instruction, and the third decoded instruction in a second update phase that uses a second set of source operands; and repeat the first update phase and the second update phase in a loop to update the FSM and the LFSR.

5. The apparatus of claim 1, wherein the first decoded instruction is a Single Instruction Multiple Data (SIMD) instruction that updates three FSM state registers and generates the output of the FSM in parallel.

6. The apparatus of claim 1, wherein the execution circuitry is operative to update the three FSM state registers by performing eight table look-ups in parallel.

7. The apparatus of claim 1, wherein the execution circuitry is operative to execute the first decoded instruction in a SIMD pipeline.

8. A method comprising:

receiving by execution circuitry a first decoded instruction to perform wireless security operations;

receiving a first operand of the first decoded instruction specifying a first vector register that stores a current state of a finite state machine (FSM);

receiving a second operand of the first decoded instruction specifying a second vector register that stores data elements of a liner feedback shift register (LFSR) that are needed for updating the FSM; and executing the first decoded instruction to produce an updated state of the FSM and an output of the FSM in a destination operand of the first decoded instruction.

9. The method of claim 8, further comprising:

receiving a second decoded instruction to perform an update to the LFSR;

receiving a first operand of the second decoded instruction specifying the second vector register;

receiving a second operand of the second decoded instruction specifying a third vector register that stores half of the data elements in the LFSR that are not in the second vector register; and executing the second decoded instruction to produce an updated left-most data element of the LFSR and a first set of shifted data elements of the LFSR in a destination operand of the second instruction.

10. The method of claim 9, further comprising:

receiving a third decoded instruction to perform the update to the LFSR;

receiving a first operand of the third decoded instruction specifying the second vector register;

receiving a second operand of the third decoded instruction specifying the third vector register; and executing the third decoded instruction to produce a second set of shifted data elements of the LFSR in a destination operand of the third decoded instruction.

11. The method of claim 10, further comprising:

executing the first decoded instruction, the second decoded instruction, and the third decoded instruction in a first update phase that uses a first set of source operands;

executing the first decoded instruction, the decoded second instruction, and the third decoded instruction in a second update phase that uses a second set of source operands; and repeating the first update phase and the second update phase in a loop to update the FSM and the LFSR.

12. The method of claim 8, wherein the first decoded instruction is a Single Instruction Multiple Data (SIMD) instruction that updates three FSM state registers and generates the output of the FSM in parallel.

13. The method of claim 12, further comprising:

updating the three FSM state registers by performing eight table look-ups in parallel.

14. The method of claim 8, further comprising:

executing the first decoded instruction in a SIMD pipeline.

15. The method of claim 8, wherein the wireless security operations are executed in one of two modes that include an initialization mode and a key-stream mode.

16. A system comprising:

memory; and a processor coupled to the memory, the processor comprising:

fetch circuitry to fetch instructions;

decode circuitry to decode fetched instructions;

a plurality of vector registers including a first vector register and a second vector register; and execution circuitry coupled to the plurality of vector registers, the execution circuitry operative to:

receive a first decoded instruction to perform wireless security operations;

receive a first operand of the first decoded instruction specifying the first vector register that stores a current state of a finite state machine (FSM);

receive a second operand of the first decoded instruction specifying the second vector register that stores data elements of a liner feedback shift register (LFSR) that are needed for updating the FSM; and execute the first decoded instruction to produce an updated state of the FSM and an output of the FSM in a destination operand of the first decoded instruction.

17. The system of claim 16, wherein the plurality of vector registers include a third vector register, the execution circuitry operative to:

receive a second decoded instruction to perform an update to the LFSR;

receive a first operand of the second decoded instruction specifying the second vector register;

receive a second operand of the second decoded instruction specifying the third vector register that stores half of the data elements in the LFSR that are not in the second vector register; and execute the second decoded instruction to produce an updated left-most data element of the LFSR and a first set of shifted data elements of the LFSR in a destination operand of the second decoded instruction.

18. The system of claim 17, wherein the execution circuitry is operative to:

receive a third decoded instruction to perform the update to the LFSR;

receive a first operand of the third decoded instruction specifying the second vector register;

receive a second operand of the third decoded instruction specifying the third vector register; and execute the third decoded instruction to produce a second set of shifted data elements of the LFSR in a destination operand of the third decoded instruction.

19. The system of claim 18, wherein the execution circuitry is operative to:

execute the first decoded instruction, the second decoded instruction, and the third decoded instruction in a first update phase that uses a first set of source operands;

execute the first instruction, the second instruction and the third instruction in a second update phase that uses a second set of source operands; and repeat the first update phase and the second update phase in a loop to update the FSM and the LFSR.

20. The system of claim 16, wherein the first decoded instruction is a Single Instruction Multiple Data.

* * * * *